US 12,063,106 B2

(12) United States Patent
Zhang

(10) Patent No.: US 12,063,106 B2
(45) Date of Patent: Aug. 13, 2024

(54) OVERHEAD MONITORING METHOD AND APPARATUS, AND COMPUTER-READABLE STORAGE MEDIUM

(71) Applicant: SANECHIPS TECHNOLOGY CO., LTD., Shenzhen (CN)

(72) Inventor: Dongbo Zhang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 286 days.

(21) Appl. No.: 17/612,407

(22) PCT Filed: Apr. 30, 2020

(86) PCT No.: PCT/CN2020/088365
§ 371 (c)(1),
(2) Date: Nov. 18, 2021

(87) PCT Pub. No.: WO2020/253403
PCT Pub. Date: Dec. 24, 2020

(65) Prior Publication Data
US 2022/0231777 A1    Jul. 21, 2022

(30) Foreign Application Priority Data
Jun. 19, 2019   (CN) .......................... 201910532405.2

(51) Int. Cl.
*H04J 3/14* (2006.01)
*H04J 3/16* (2006.01)
*H04L 1/00* (2006.01)

(52) U.S. Cl.
CPC .............. *H04J 3/14* (2013.01); *H04J 3/1658* (2013.01); *H04L 1/0006* (2013.01);
(Continued)

(58) Field of Classification Search
None
See application file for complete search history.

(56) References Cited

U.S. PATENT DOCUMENTS

| 7,787,502 B1 * | 8/2010 | Olsson .................. H04J 3/1682 370/542 |
| 2010/0092174 A1 * | 4/2010 | Brown ..................... H04L 25/14 398/79 |

(Continued)

FOREIGN PATENT DOCUMENTS

| CN | 107437973 A | 12/2017 |
| CN | 108809901 A | 11/2018 |
| CN | 109257139 A | 1/2019 |

OTHER PUBLICATIONS

International Searching Authority. International Search Report and Written Opinion for PCT Application No. PCT/CN2020/088365 and English translation, mailed Jul. 30, 2020, pp. 1-10.

(Continued)

*Primary Examiner* — Bob A Phunkulh
(74) *Attorney, Agent, or Firm* — Vivacqua Crane, PLLC

(57) ABSTRACT

Disclosed are an overhead monitoring method and apparatus, and a non-transitory computer-readable storage medium. The method may include: receiving a flexible Ethernet (FlexE) signals from one or more PHY interfaces respectively; de-interleaving each FlexE signal with the transmission rate of N*Y Gbps in the received FlexE signals respectively into N PHY signals each having a transmission rate of Y Gbps; selecting M valid data signals from the FlexE signal with the transmission rate being the target transmission rate in the received FlexE signals and the de-interleaved PHY signals with the transmission rate of Y Gbps; removing each pad from each of the M valid data signals, performing frame delimitation on each of the M valid data signals, and extracting each FlexE overhead from each of the M valid data signals; and generating a linear overhead frame based on the extracted FlexE overheads, and outputting the linear overhead frame.

14 Claims, 5 Drawing Sheets

(52) U.S. Cl.
CPC .......... *H04L 1/0061* (2013.01); *H04L 1/0071* (2013.01); *H04J 2203/0057* (2013.01); *H04J 2203/0085* (2013.01)

(56) References Cited

U.S. PATENT DOCUMENTS

| | | | | |
|---|---|---|---|---|
| 2017/0005742 A1* | 1/2017 | Gareau | ................ | H04J 3/1658 |
| 2017/0005901 A1* | 1/2017 | Gareau | ................ | H04L 43/10 |
| 2017/0005949 A1* | 1/2017 | Gareau | ................ | H04L 12/413 |
| 2017/0093757 A1* | 3/2017 | Gareau | ................ | H04J 3/065 |
| 2018/0076932 A1* | 3/2018 | Okada | ................ | H04L 5/0001 |
| 2018/0123714 A1 | 5/2018 | Zhong et al. | | |
| 2018/0167160 A1* | 6/2018 | Gareau | ................ | H04L 41/00 |
| 2019/0173856 A1* | 6/2019 | Gareau | ................ | H04L 9/3215 |
| 2019/0280797 A1* | 9/2019 | Zha | ................ | H04Q 11/0062 |
| 2021/0399992 A1* | 12/2021 | Liu | ................ | H04B 10/60 |
| 2022/0158938 A1* | 5/2022 | Cavaliere | ................ | H04L 45/50 |
| 2022/0231777 A1* | 7/2022 | Zhang | ................ | H04J 3/14 |
| 2023/0389960 A1* | 12/2023 | Haran | ................ | A61B 17/4241 |
| 2023/0395273 A1* | 12/2023 | Roillet | ................ | G21C 19/10 |

OTHER PUBLICATIONS

Gorshe, Steven. OTN Interface Standards for Rates Beyond 100 Gbit/s, Journal of Lightwave Technology, 2017, pp. 1-9, IEEE.

Intellectual Property India. Examination Report for IN Application No. 202127058450 and English translation, mailed Aug. 25, 2022, pp. 1-5.

European Patent Office. Extended European Search Report for EP Application No. 20827175.9, mailed May 23, 2022, pp. 1-6.

European Patent Office. Communication pursuant to Article 94(3) EPC for EP Application No. 20827175.9, mailed May 15, 2024, pp. 1-7.

* cited by examiner

OVERHEAD MONITORING METHOD AND APPARATUS, AND COMPUTER-READABLE STORAGE MEDIUM

CROSS-REFERENCE TO RELATED APPLICATION

This application is a national stage filing under 35 U.S.C. § 371 of international application number PCT/CN2020/088365, filed Apr. 30, 2020, which claims priority to Chinese patent application No. 201910532405.2, filed Jun. 19, 2019. The contents of these applications are incorporated herein by reference in their entirety.

TECHNICAL FIELD

The embodiments of this disclosure relate to the technical field of Flexible Ethernet (FlexE), such as an overhead monitoring method and apparatus, and a computer-readable storage medium.

BACKGROUND

FlexE is an interfacing technology to realize service isolation and network slicing in a bearer network, which has the characteristics of flexible bandwidth, data isolation, and the like. Based on a time division multiplexing mechanism, a FlexE device divides time domain resources of a Physical Layer (PHY) transceiver with a transmission rate of 100 Gbit/s into 20 time slots, and data is to be transmitted and received at each 20 time slots as a cycle. Transmitting and receiving rates of the PHY transceiver for each slot of these 20 time slot are 5 Gbit/s. In each cycle, the FlexE device may send one data block in one time slot or receive one data block in one time slot by using the PHY transceiver, and one FlexE client may correspond to one or more time slots. These 20 time slots in the time domain resources of the PHY transceiver may correspond to one or more FlexE clients, and mapping relationship that maps a FlexE clients with a time slot is called a Calendar. Data transmitted from the FlexE device by the PHY transceiver is composed of a data block and an Overhead (OH). Every 20*1023 consecutive data blocks are preceded with one FlexE overhead, wherein symbol * is a multiplication sign. Each data block may be a 64-bit/66-bit (64b/66b) coded data block of a transmission channel, and each overhead is a 66-bit data block.

In order to obtain current PHY information and ensure the reliability of communication, it is necessary to monitor the FlexE overhead in real time off a FlexE chip (off-chip for short), so as to quickly respond when something is wrong with the PHY. In some technical schemes, there is provided a method for reading a FlexE overhead through an off-chip Central Processing Unit (CPU) interface, but this is disadvantageous since the CPU interface cannot read the varied overheads for each frame, and the CPU interface is slow in response. Therefore, it is necessary to effectively monitor the FlexE overhead in real time at a FlexE transmitting terminal.

SUMMARY

The embodiments of the present disclosure provide an overhead monitoring method and apparatus, and a computer-readable storage medium, such that real time monitoring for a FlexE overhead can be performed off-chip by a FlexE transmitting terminal device.

An embodiment of the present disclosure provides an overhead monitoring method, may include: receiving an Ethernet FlexE signals from at least one physical layer PHY interface respectively, wherein each received FlexE signal includes a FlexE signal with a transmission rate being N times of Y Gbps and a FlexE signal with a transmission rate being a target transmission rate, the FlexE signal with the transmission rate being the target transmission rate includes at least one of a FlexE signal with a transmission rate of $$\frac{Y}{2} \text{ Gbps}$$

and a FlexE signal with a transmission rate of X Gbps, where Y is a predetermined basic transmission rate, X=Y*C, N is a natural number greater than 1 and may vary with the received FlexE signals, and C is a fixed coefficient; de-interleaving each FlexE signal with a transmission rate of N*Y Gbps in the received FlexE signals respectively into N PHY signals each having a transmission rate of Y Gbps; selecting M valid data signals from the FlexE signal with a transmission rate being the target transmission rate in each received FlexE signal and the de-interleaved PHY signals each having a transmission rate of Y Gbps, wherein M is a natural number greater than or equal to 1; removing each pad from each of the M valid data signals, performing frame delimitation on each of the M valid data signals, and extracting each FlexE overheads from each of the M valid data signals; and generating a linear overhead frame based on the extracted FlexE overheads, and outputting the linear overhead frame; wherein, the linear overhead frame includes each extracted FlexE overhead.

An embodiment of the present disclosure further provides a computer-readable storage medium, wherein the computer-readable storage medium stores one or more programs, and the one or more programs are executable by one or more processors to implement any one of the overhead monitoring methods mentioned above.

An embodiment of the present disclosure further provides an overhead monitoring apparatus, including a processor and a memory, wherein: the processor is configured to execute a program stored in the memory to implement any one of the overhead monitoring methods mentioned above.

An embodiment of the present disclosure further provides an overhead monitoring apparatus, including a receiving module, a de-interleaving module, a cross-selection module, an overhead extracting module and a framing and outputting module, wherein the receiving module is configured for receiving a flexible Ethernet FlexE signals from at least one physical layer PHY interface respectively, wherein each received FlexE signal includes a FlexE signal with a transmission rate being N times of Y Gbps and a FlexE signal with a transmission rate being a target transmission rate, the FlexE signal with the transmission rate being the target transmission rate includes at least one of a FlexE signal with a transmission rate of $$\frac{Y}{2} \text{ Gbps}$$

and a FlexE signal with a transmission rate of X Gbps, where Y is a predetermined basic transmission rate, X=Y*C, N is a natural number greater than 1 and may vary with the received FlexE signals, and C is a fixed coefficient; the de-interleaving module is configured for de-interleaving each FlexE signal with a transmission rate of N*Y Gbps in the received FlexE signals respectively into N PHY signals each having a transmission rate of Y Gbps; the cross-selection module is configured for selecting M valid data signals from the FlexE signal with a transmission rate being the target transmission rate in the received FlexE signals and the de-interleaved PHY signals each having a transmission rate of Y Gbps, wherein M is a natural number greater than or equal to 1; the overhead extracting module is configured for removing each pad from each of the M valid data signals, performing frame delimitation on each of the M valid data signals, and extracting each FlexE overhead from each of the M valid data signals; and the framing and outputting module is configured for generating a linear overhead frame based on the extracted FlexE overheads, and outputting the linear overhead frame; wherein, the linear overhead frame includes each extracted FlexE overhead.

BRIEF DESCRIPTION OF DRAWINGS

The accompanying drawings serve to provide a further understanding of the technical solutions of the present disclosure and constitute a part of the specification, and are used together with the embodiments of the present disclosure to explain the technical solutions of the present disclosure, and do not constitute limitations to the technical solutions of the present disclosure.

DETAILED DESCRIPTION

The embodiments of the present disclosure are described below with reference to the accompanying drawings.

The steps shown in the flowchart of the accompanying drawings may be executed in a computer system configured to execute a set of computer executable instructions. Also, although a logical sequence is shown in the flowchart, in some cases, the steps shown or described may be executed in a different sequence.

FlexE binds 1 to n Ethernet PHYs into one high-rate channel, which is called a FlexE Group. In the FlexE protocol, a FlexE Client is defined as an Ethernet data stream based on a Medium Access Control (MAC) rate. Rates of various FlexE Clients in a FlexE Group may be different. For example, for a FlexE Group with four 100-G PHYs bonded, rates of each of the FlexE Clients may be 10 G, 40 G, 75 G, 150 G, 200 G, 300 G, and the like. The mechanism of FlexE makes it possible to support services of various rates with 100-G PHY(s) only, so that the network can be upgraded at a low cost. In this protocol, a Shim layer is added between a Reconciliation Sublayer (RS) and a Physical Coding Sublayer (PCS) of an IEEE802.3 protocol stack to adjust various MAC rates, thus realizing this flexible mechanism.

The FlexE Shim layer constructs a Calendar time slot table with a size of 20*n 66-bit blocks based on the number of bonded PHYs, and each 66-bit block represents a 5G time slot, wherein n is the number of the bonded Ethernet PHYs and * is a multiplication sign. Twenty Calendar time slots of each PHY are called Sub-Calendar. In a FlexE Group, a Calendar time slot is uniquely identified by a PHY Number and a Slot ID ranged from 0 to 19 in the PHY. A user is allocated with m*5G time slots based on a service rate, and these time slots may be located in the Sub-Calendars of different PHYs of one FlexE Group. The FlexE Shim layer at a transmitting side loads the service data into the configured 66-bit block of the corresponding Calendar time slot. For the Sub-Calendar of each PHY, an Overhead (OH) of one 66-bit block is inserted every 20*1023 66-bit blocks to store related mapping relationships and control information. An overhead frame is comprised of eight overheads, and a multiframe is comprised of 32 overhead frames. At a receiving side, n Sub-Calendars constitute a Calendar with a size of 20*n, and the corresponding client services are recovered according to the mapping relationship stored in the overhead.

Figure 1:
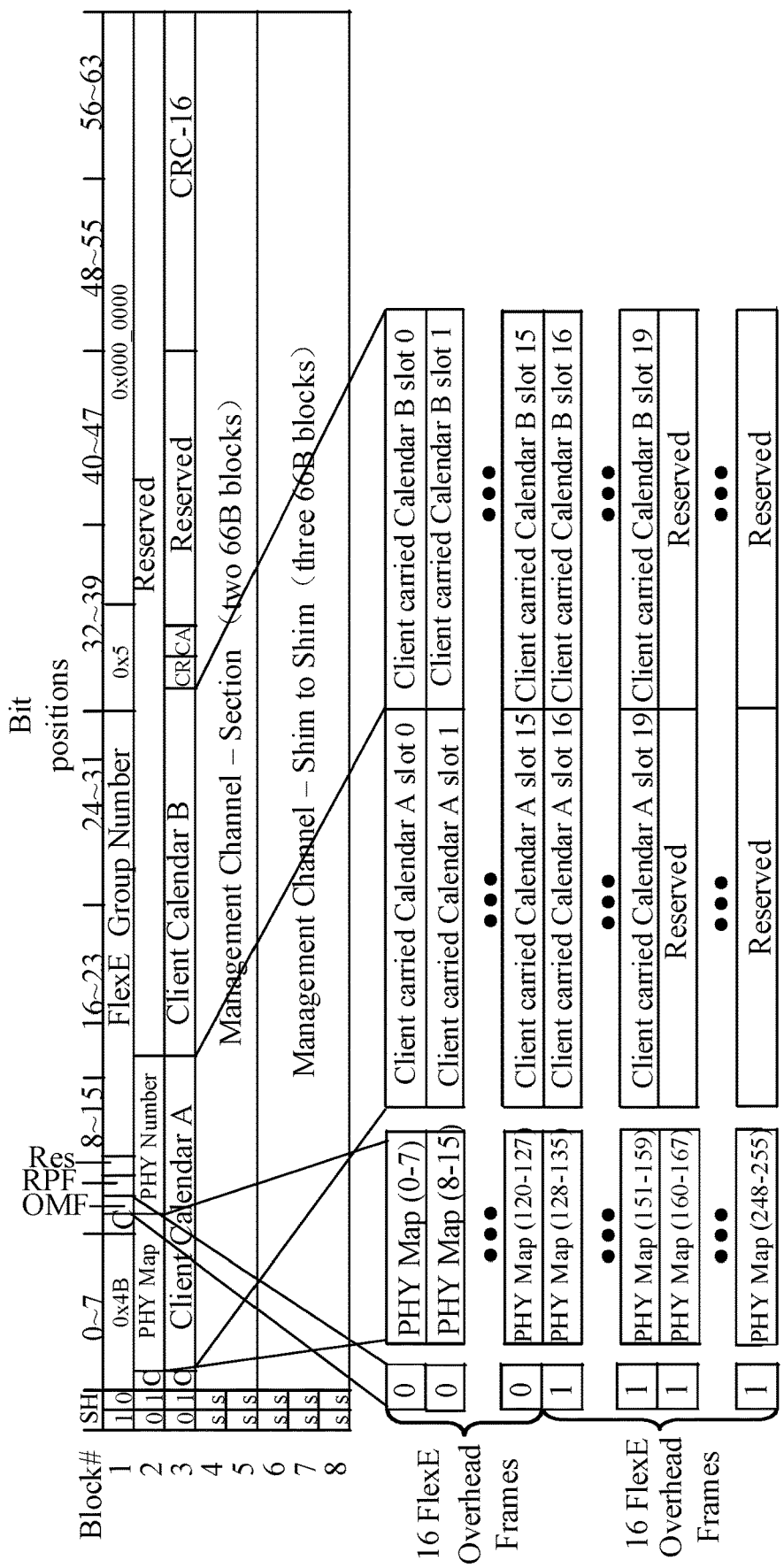
FIG. 1 is a schematic structural diagram of a FlexE overhead format.

In the FlexE overhead shown in FIG. 1, C field indicates the Calendar configuration in use; OMF field indicates the Overhead Multiframe Indicator; RPF field indicates the Remote PHY Fault; field CR indicates the Calendar Switch Request; CA field indicates the Calendar Switch Acknowledge; SS field indicates the Valid sync header bits (01 or 10); PHY Map field indicates Control of which PHYs are members of this group; and CRC-16 field is a CRC16 calculation result of the first three overhead blocks.

Example Embodiment One: Overhead Monitoring Method

Figure 2:
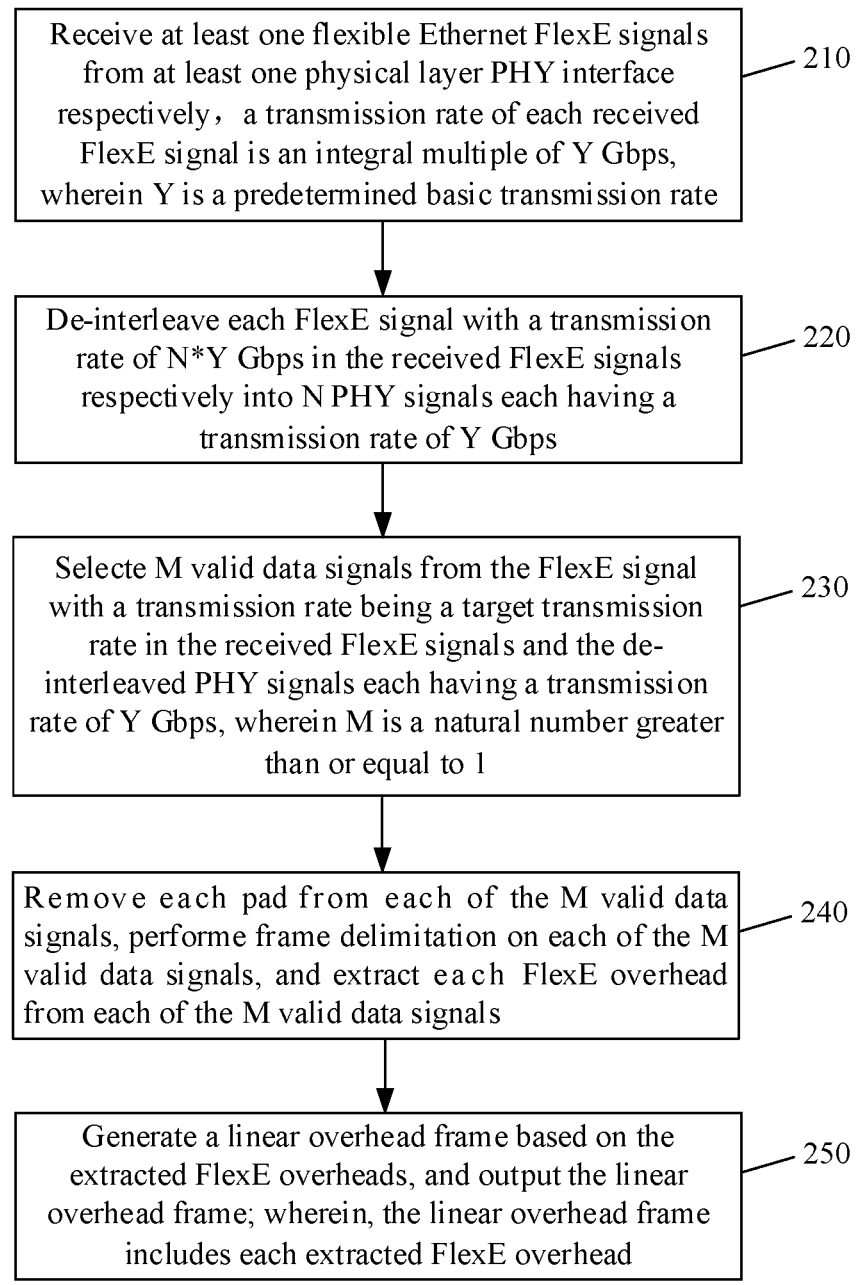
FIG. 2 is a flowchart of an overhead monitoring method according to an embodiment of the present disclosure.

As shown in FIG. 2, an embodiment of the present disclosure provides an overhead monitoring method, including:

At step 210: a FlexE signal is received from at least one PHY interface respectively, wherein each received FlexE signal includes a FlexE signal with a transmission rate being N times of Y Gbps and a FlexE signal with a transmission rate being a target transmission rate, the FlexE signal with a transmission rate being the target transmission rate includes at least one of, a FlexE signal with a transmission rate of $$\frac{Y}{2} \text{ Gbps}$$

and a FlexE signal with a transmission rate of X Gbps, where Y is a predetermined basic transmission rate, X=Y*C, N is a natural number greater than 1 and may vary with the received FlexE signals, and C is a fixed coefficient.

In an embodiment, Y is equal to 103.125*20479/20480, C is equal to 20480/20479*16383/16384, then the transmission rate of the FlexE signals received from each PHY interface is N times of 103.125*20479/20480 Gbps or 103.125*16383/16384 Gbps or ½*103.125*20479/20480 Gbps. For example, a FlexE signal with a transmission rate of ½*103.125*20479/20480 Gbps is received from a 50-G PHY interface, a FlexE signal with a transmission rate of 103.125*16383/16384 Gbps is received from a 100-G PHY interface, a FlexE signal with a transmission rate of 2*103.125*20479/20480 Gbps is received from a 200-G PHY interface, and a FlexE signal with a transmission rate of 4*103.125*20479/20480 Gbps is received from a 400-G PHY interface.

At step 220: each FlexE signal with a transmission rate of N*Y Gbps in the received FlexE signals is de-interleaved respectively into N PHY signals each having a transmission rate of Y Gbps.

In this embodiment, for FlexE signals received from various PHY interfaces, such as from a 50G PHY interface, a 200-G PHY interface, a 400-G PHY interface or other PHY interfaces over 100G, each overhead is processed in the same manner and in accordance with that of the transmission format of the FlexE signal received from the 100-G PHY interface, irrelevant of a particular transmission rate of that interface, in which the transmission formats of a 50G PHY interface and a 100G PHY interface are identical to each other. Therefore, it is necessary to firstly de-interleave FlexE signals received from a 200G PHY interface, a 400G PHY interface or other PHY interfaces over 100G to respectively generate two, four or other quantity of PHY signals with the transmission rate of 103.125*20479/20480 Gbps, and then to extract and process the overhead.

At step 230: M valid data signals are selected from the FlexE signal with a transmission rate being the target transmission rate in the received FlexE signals and the de-interleaved PHY signals each having a transmission rate of Y Gbps, wherein M is a natural number greater than or equal to 1.

The valid data signals according to the embodiments of the present disclosure refer to the FlexE signals that transmit valid data.

At step 240: each pad is removed from each of the M valid data signals, performing frame delimitation on each of the M valid data signals, and each FlexE overhead is extracted from each of the M valid data signals.

In this embodiment, since two, four, eight or other quantity of 66-B pads are respectively inserted into the FlexE signals received from a 50G PHY interface, a 200G PHY interface, a 400G PHY interface or other PHY interfaces over 100G at fixed intervals, it is necessary to remove the pads before frame delimitation. Therefore, it is necessary to remove the pads from a PHY signal de-interleaved from FlexE signals received by a 50G PHY interface or a PHY interface over 100G, while it is unnecessary to remove the pads from the FlexE signals received from a 100-G PHY interface. After that, the frame header is searched for according to a fixed FlexE frame header pattern to generate a frame delimitation alarm. After the frame header is found, the position of the FlexE overhead to be extracted is determined according to a fixed interval position. Since the multiframe indication signal (OMF field in FIG. 1) has only 1 bit (either 0 or 1), it is necessary to determine a position number i of the FlexE overhead to be extracted in a multiframe, wherein i is an integer ranging from 0 to 31.

In one embodiment, removing each pad from each of the M valid data signals includes following steps: in response to a determination that the FlexE signal with the transmission rate being the target transmission rate includes a FlexE signal with a transmission rate of $$\frac{Y}{2}$$

$$\frac{Y}{2} \text{ Gbps,}$$

further determining whether each valid data signal of the M valid data signals is a FlexE signal with a transmission rate of X Gbps or a PHY signal with a transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and in response to a determination that the FlexE signal with a transmission rate being the target transmission rate includes a FlexE signal a the transmission rate of $$\frac{Y}{2} \text{ Gbps}$$

and a FlexE signal with a transmission rate of X Gbps, further determining whether each valid data signal of the M valid data signals is a FlexE signal with a transmission rate of X Gbps, a FlexE signal with a transmission rate of $$\frac{Y}{2} \text{ Gbps}$$

or a PHY signal with a transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of $$\frac{Y}{2} \text{ Gbps}$$

or a PHY signal with a transmission rate of Y Gbps, determining that at least one pad presents in each valid data signal, and removing each pad.

In one embodiment, performing frame delimitation on each of the M valid data signals includes: respectively performing the following operations on the M valid data signals: searching for a FlexE frame header according to a predetermined frame header pattern; and after the FlexE frame header is found, determining the position of the FlexE overhead to be extracted and the position number i of the FlexE overhead to be extracted in the multiframe, wherein i is an integer ranging from 0 to 31.

At step 250: a linear overhead frame is generated based on the extracted FlexE overheads, and outputting the linear overhead frame; wherein, the linear overhead frame includes the FlexE overheads.

As can be seen from the FlexE overhead frame format in FIG. 1, the FlexE overhead frame has 8 rows in total, and each row has a 66-bit FlexE overhead. Excluding the 2-bit sync header, the FlexE overhead in each row takes up 64 bits. When the overheads are being extracted, the FlexE overheads of a plurality of rows may be combined together end to end and be packaged into one linear overhead frame, or one row of the FlexE overhead may be split into a plurality of linear overhead frames according to bandwidth for the linear overhead frame (for example, the FlexE overhead frame of 8 rows may be split into 4 groups with each group having 2 rows, and every 2 rows are combined together end to end and packaged into one linear overhead frame, so that all the 8 rows of the FlexE overheads in one FlexE frame may be packaged into four linear overhead frame respectively and may be transmitted in four times with one linear overhead frame transmitted each time). It can be seen from FIG. 1 that 28 bits in the first row of FlexE overheads are fixedly set to be all zero, and a plurality of bits in each of the second and third rows of FlexE overheads are served as reserved fields. By using these preset fixed all-zero positions or reserved field positions, a plurality of overhead alarms may be transmitted, and real time monitoring and controlling can be performed over these overhead alarms off-chip and response can be made in time.

In an embodiment, after the FlexE overheads are extracted, the overhead data extracted from the FlexE signals with a transmission rate of X Gbps and/or the FlexE signals with a transmission rate of $$\frac{Y}{2} \text{ Gbps,}$$

and a plurality of PHY signals with the transmission rate of Y Gbps need to be converted into time-division data through a round-robin scheduling and then outputted. On the condition that the linear overhead frame meets the bandwidth requirement, the overhead data only needs to be outputted according to the order of the PHY numbers. Cyclic Redundancy Check (CRC) code is added to the outputted time-division FlexE overhead data, and then the time-division data and the CRC code are together packaged into a linear overhead frame. Coding (such as 8b/10b coding or 64b/66b coding) is performed on the linear overhead frame, and then the linear overhead frame is converted into a SERializer/DESerializer (serdes) clock domain through an asynchronous First Input First Output (FIFO) queue, and then outputted off-chip. It is not intended to limit how the generated linear overhead frame is outputted off-chip in this disclosure, for example, the generated linear overhead frame may also be outputted off-chip by other cross-clock domain conversion methods except serdes.

The linear overhead line frame mentioned in the present disclosure refers to a frame containing one or more PHY interface information, FlexE overhead and other information (such as CRC code, overhead alarm, or the like). The linear overhead frame is generated by a FlexE chip and read off the FlexE chip. Any pre-defined frame format may be particularly used as a desired frame format.

As compared to some technical schemes, the embodiments of the present disclosure include the steps of: receiving a FlexE signal from one or more PHY interfaces respectively, wherein each of the received FlexE signal includes a FlexE signal with the transmission rate being N times of Y Gbps and a FlexE signal with the transmission rate being the target transmission rate, the FlexE signal with the transmission rate being the target transmission rate includes at least one of, a FlexE signal with a $$\frac{Y}{2} \text{ Gbps}$$

and a FlexE signal with a transmission rate of X Gbps, where Y is a predetermined basic transmission rate, X=Y*C, N is a natural number greater than 1 and may vary with the received FlexE signals, and C is a fixed coefficient; de-interleaving each FlexE signal with the transmission rate of N*Y Gbps in the received FlexE signals respectively into N PHY signals each having the transmission rate of Y Gbps; selecting M valid data signals from the FlexE signal with the transmission rate being the target transmission rate in the received FlexE signals and the de-interleaved PHY signals each having the transmission rate of Y Gbps, wherein M is a natural number greater than or equal to 1; removing each pad from each of the M valid data signals, performing frame delimitation on each of the M valid data signals, and extracting each FlexE overhead from each of the M valid data signals; and generating a linear overhead frame based on the extracted FlexE overheads, and outputting the linear overhead frame, such that real time monitoring and controlling over the FlexE overheads can be performed by the FlexE transmitting terminal off-chip.

Figure 3:
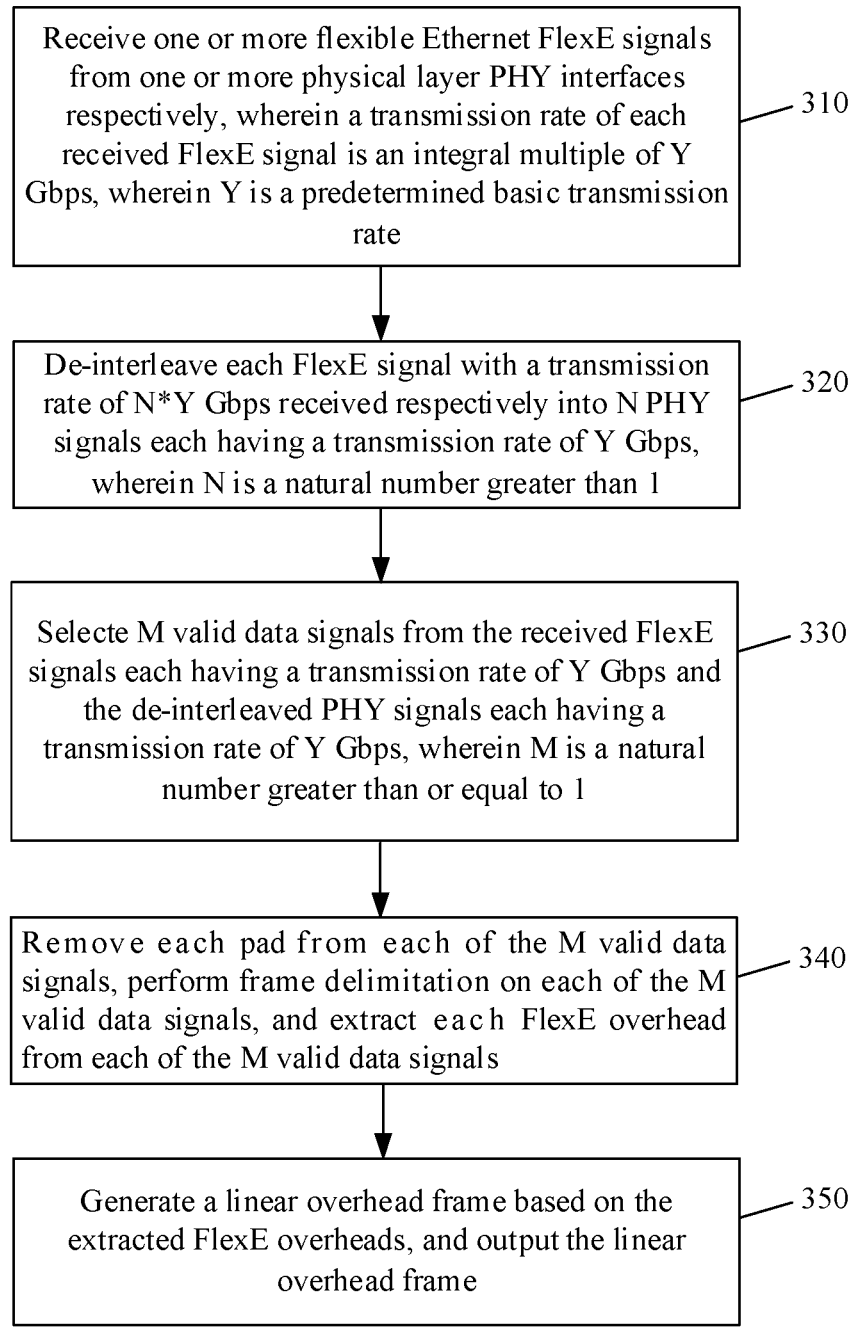
FIG. 3 is a flowchart of another overhead monitoring method according to an embodiment of the present disclosure.

As shown in FIG. 3, an embodiment of the present disclosure provides an overhead monitoring method, including following steps:

At step 310: a flexible Ethernet FlexE signal is received from one or more physical layer PHY interfaces respectively, wherein a transmission rate of each received FlexE signal is an integral multiple of Y Gbps, wherein Y is a predetermined basic transmission rate.

In an embodiment, Y equals to 100. The transmission rate of each of the FlexE signal received is an integer multiple of 100 Gbps, such as 100 Gbps, 200 Gbps, 400G bps, or the like.

At step 320: each received FlexE signal with a transmission rate of N*Y Gbps is de-interleaved respectively into N PHY signals each having a transmission rate of Y Gbps, wherein N is a natural number greater than 1 and may vary with the received FlexE signals.

In this disclosure, for various FlexE PHY interfaces, such as PHYs of 100 Gbps, 200 Gbps, 400 Gbps or other transmission rates, each overhead is processed in the same manner and in accordance with that of the transmission rate of 100 Gbps and irrelevant of a particular transmission rate of that interface, which requires to de-interleave the FlexE signals of 200 Gbps, 400 Gbps or other rates to respectively generate two, four or other quantity of FlexE signals each having a transmission rate of 100 Gbps, and then to perform overhead extracting and processing.

Figure 4:
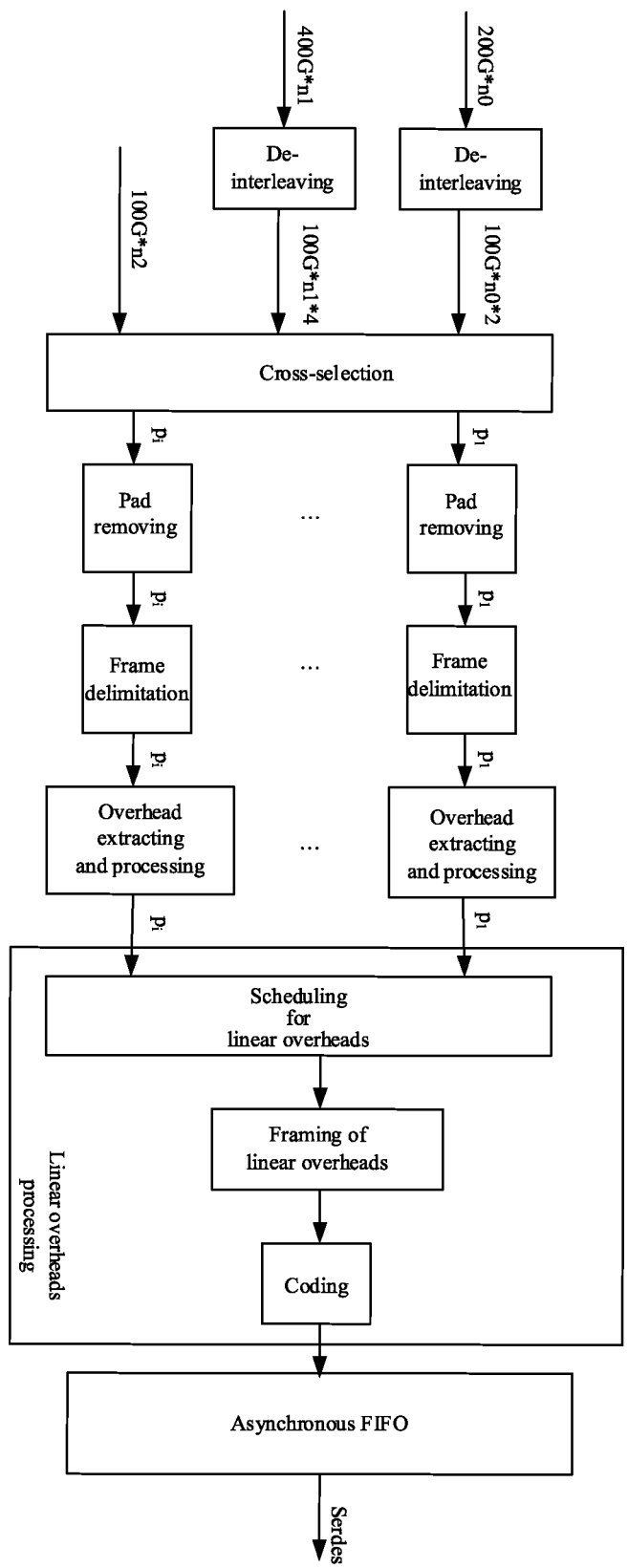
FIG. 4 is a schematic diagram showing signal flow in another overhead monitoring process according to an embodiment of the present disclosure.

For example, as shown in FIG. 4, in the case that the received FlexE signals include n0 FlexE signals each having a transmission rate of 200 Gbps, n1 FlexE signals each having a transmission rate of 400 Gbps and n2 FlexE signals each having a transmission rate of 100 Gbps, the n0 FlexE signals each having the transmission rate of 200 Gbps and the n1 FlexE signals each having the transmission rate of 400 Gbps are respectively de-interleaved into n0*2 FlexE signals each having a transmission rate of 100 Gbps and n1*4 FlexE signals each having a transmission rate of 100 Gbps.

At step 330: M valid data signals are selected from the received FlexE signals each having the transmission rate of Y Gbps and the de-interleaved PHY signals each having the transmission rate of Y Gbps, wherein M is a natural number greater than or equal to 1.

Still taking FIG. 4 as an example, M valid data signals are selected from the received n2 FlexE signals each having the transmission rate of 100 Gbps and the de-interleaved (n0*2+n1*4) FlexE signals each having the transmission rate of 100 Gbps. The valid data signals according to the embodiments of the present disclosure refer to the FlexE signals that transmit valid data.

At step 340: each pad is removed from each of the M valid data signals, frame delimitation is performed on each of the M valid data signals, and each FlexE overhead is extracted from each of the M valid data signals.

It should be noted that since four, eight or other quantity of 66-B pads are respectively inserted into the FlexE signals with the transmission rates of 200 Gbps and 400 Gbps or other non-100 Gbps at fixed intervals, it is necessary to remove the pads before frame delimitation. Therefore, it is necessary to remove the pads from signals with the transmission rate of 100 Gbps de-interleaved from the FlexE signals with the transmission rates of 200 Gbps and 400 Gbps or other rates except 100 Gbps. And it is unnecessary to remove the pads from the received signals with the transmission rates of 100 Gbps. After that, the frame header is searched for according to a fixed FlexE frame header pattern to generate a frame delimitation alarm. After the frame header is found, the position of the FlexE overhead to be extracted is determined according to a fixed interval position. Since a multiframe indication signal (OMF field in FIG. 1) has only 1 bit (either 0 or 1), it is necessary to determine a position number i of the FlexE overhead to be extracted in a multiframe, wherein i is an integer ranging from 0 to 31.

In an embodiment, removing each pad from each of the M valid data signals includes following steps: determining whether each valid data signal is a received FlexE signal with a transmission rate of Y Gbps or a de-interleaved PHY signal with a transmission rate of Y Gbps; in response to a determination that each valid signal is a FlexE signal with a transmission rate of Y Gbps, determining that no pad presents in the valid data signal; and in response to a determination that a valid signal is a de-interleaved PHY signal a transmission rate of Y Gbps, determining that at least one pad presents in that valid data signal, and remove each pad.

In an embodiment, performing frame delimitation on each of the M valid data signals includes following steps: respectively performing following operations on each of the M valid data signals: searching for a FlexE frame header according to a predetermined frame header pattern; and after the FlexE frame header is found, determining a position of the FlexE overhead to be extracted and a position number i of the FlexE overhead to be extracted in a multiframe, wherein i is an integer ranging from 0 to 31.

At step 350: a linear overhead frame is generated based on the extracted FlexE overheads, and outputting the linear overhead frame.

After the FlexE overheads are extracted, the overhead data extracted from a plurality of FlexE signals with the transmission rate of 100 Gbps need to be converted into time-division data through a round-robin scheduling and then outputted. On the condition that the linear overhead frame meets the bandwidth requirement, the overhead data only needs to be outputted according to the order of the PHY numbers. Cyclic Redundancy Check (CRC) code is added to the outputted time-division FlexE overhead data, and then the time-division data and the CRC code are together packaged into a linear overhead frame. Coding (such as 8b/10b coding and 64b/66b coding) is performed on the linear overhead frame, and then the linear overhead frame is converted into a SERializer/DESerializer (serdes) clock domain through an asynchronous First Input First Output (FIFO) queue, and then outputted off-chip. It is not intended to limit how to output the generated overhead line frame off-chip in this disclosure, for example, the generated linear overhead frame may also be outputted off-chip by other cross-clock domain conversion methods except serdes.

In an embodiment, generating a linear overhead frame based on the extracted FlexE overheads includes following steps: dividing a row of the FlexE overheads in a FlexE frame into one or more linear overhead frames; or, combining a plurality of rows of the FlexE overheads in the FlexE frame into one linear overhead frame.

In an embodiment, generating a linear overhead frame based on the extracted FlexE overheads further includes following steps: adding an overhead alarm at one or more of the preset fixed all-zero positions and/or at a reserved field position in the FlexE overhead, wherein the overhead alarm is indicative of a status of the FlexE overhead (for example, the alarm may be indicative of a normal state or an error state, or the like).

In this embodiment, after the frame header is found, a FlexE overhead is extracted at a fixed position and is processed to generate an overhead alarm.

In an embodiment, generating a linear overhead frame based on the extracted FlexE overheads includes following steps: converting the extracted FlexE overheads into a time-division output FlexE overhead according to a predetermined round-robin scheduling sequence, and packaging the time-division output FlexE overhead into a linear overhead frame.

In another embodiment, generating a linear overhead frame based on the extracted FlexE overheads includes following steps: converting the extracted FlexE overheads into a time-division output FlexE overhead according to a predetermined round-robin scheduling sequence, and outputting the time-division data; adding a CRC code into the outputted time-division data, and packaging the outputted time-division data and the CRC code into a linear overhead frame.

In an embodiment, generating a linear overhead frame based on the extracted FlexE overheads further includes a step of: coding the packaged linear overhead frame.

In an example of this embodiment, coding the packaged linear overhead frame particularly includes: performing 8b/10b or 64b/66b coding on the packaged linear overhead frame.

It should be noted that 8b/10b coding is to decompose a group of continuous 8-bit data into two groups of data, one group of 3-bits codes and the other group of 5-bit codes, which are then encoded into one group of 4-bit codes and the other group of 6-bit codes respectively, thus forming a group of 10-bit data to be transmitted.

And 64-b/66-b coding is to encode 64-bit data or control information into a 66-bit block for transmission, and each of the first two bits of the 66-bit block represents a sync header. 64-b/66-b coding is a key part of a PCS layer of a 10-Gigabit Ethernet, which is not a real coding, but a coding-decoding scheme based on a scrambling mechanism. This coding scheme is a standard coding scheme of 10 Gigabit communication recommended by IEEE.

Example Embodiment Two: Computer-Readable Storage Medium

An embodiment of the present disclosure further provides a computer-readable storage medium, wherein the computer-readable storage medium stores one or more programs, and the one or more programs are executable by one or more processors to implement the steps of the overhead monitoring method according to any of the above embodiments.

Example Embodiment Three: Overhead Monitoring Apparatus I

An embodiment of the present disclosure further provides an overhead monitoring apparatus, including a processor and a memory, wherein: the processor is configured to execute programs stored in the memory to implement the steps of the overhead monitoring method according to any of the above embodiments.

Example Embodiment Four: Overhead Monitoring Apparatus II

Figure 5:
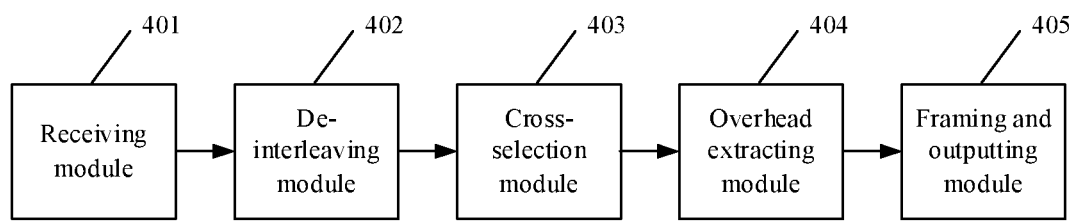
FIG. 5 is a schematic structural diagram of an overhead monitoring apparatus according to an embodiment of the present disclosure.

As shown in FIG. 5, an embodiment of the present disclosure further provides an overhead monitoring apparatus, including a receiving module 401, a de-interleaving module 402, a cross-selection module 403, an overhead extracting module 404 and a framing and outputting module 405, $$\frac{Y}{2} \text{ Gbps}$$

and a FlexE signal with a transmission rate of X Gbps, Y is a predetermined basic transmission rate, X=Y*C, N is a natural number greater than 1 and may vary with the received FlexE signals, and C is a fixed coefficient; the de-interleaving module 402 is configured for de-interleaving each FlexE signal with a transmission rate of N*Y Gbps in the received FlexE signals respectively into N PHY signals each having a transmission rate of Y Gbps; the cross-selection module 403 is configured for selecting M valid data signals from the FlexE signal with the transmission rate being the target transmission rate in the received FlexE signals and the de-interleaved PHY signals each having the transmission rate of Y Gbps, wherein M is a natural number greater than or equal to 1; the overhead extracting module 404 is configured for removing each pad from each of the M valid data signals, performing frame delimitation on each of the M valid data signals, and extracting each FlexE overhead from each of the M valid data signals; and the framing and outputting module 405 is configured for generating a linear overhead frame based on the extracted FlexE overheads, and outputting the linear overhead frame; wherein, the linear overhead frame includes each of the FlexE overheads.

$$\frac{Y}{2} \text{ Gbps}$$

and does not include a FlexE signal with a transmission rate of X Gbps, determining that at least one pad presents in each valid data signal of the M valid data signals, and removing each pad; in response to a determination that the FlexE signal with the transmission rate being the target transmission rate includes a FlexE signal with a transmission rate of X Gbps and does not include any FlexE signal with a transmission rate of $$\frac{Y}{2}$$

$$\frac{Y}{2} \text{ Gbps}$$

and a FlexE signal with a transmission rate of X Gbps, further determining whether each valid data signal of the M valid data signals is a FlexE signal with a transmission rate of X Gbps, a FlexE signal with a transmission rate of $$\frac{Y}{2} \text{ Gbps}$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2} \text{ Gbps}$$

or a PHY signal with a transmission rate of Y Gbps, determining that at least one pad presents in each valid data signal, and removing each pad.

In an embodiment, the overhead extracting module 404 is configured for performing frame delimitation on each of the M valid data signals through the following steps of, respectively performing the following operations on each the M valid data signals: searching for a FlexE frame header according to a predetermined frame header pattern; and after the FlexE frame header is found, determining a position of the FlexE overhead to be extracted and a position number i of the FlexE overhead to be extracted in a multiframe, wherein i is an integer ranging from 0 to 31.

In an embodiment, the framing output module 405 is configured for generating a linear overhead frame based on the extracted FlexE overheads through the following steps: dividing a row of the FlexE overheads in a FlexE frame into one or more linear overhead frames; or, combining a plurality of rows of the FlexE overheads in the FlexE frame into one linear overhead frame.

In an embodiment, the framing output module 405 is configured for generating a linear overhead frame based on the extracted FlexE overheads through the following steps: adding an overhead alarm at one or more of the preset fixed all-zero positions and/or at a reserved field position in the FlexE overhead, wherein the overhead alarm is indicative of a status of the FlexE overhead.

In an embodiment, the framing and outputting module 405 is configured for generating a linear overhead frame based on the extracted FlexE overheads through the following steps: converting the extracted FlexE overheads into time-division data according to a predetermined round-robin scheduling sequence, and outputting the time-division data; and packaging the outputted time-division data into a linear overhead frame.

In another embodiment, the framing and outputting module 405 is configured for generating a linear overhead frame based on the extracted FlexE overheads through the following steps: converting the extracted FlexE overheads into time-division data according to a predetermined round-robin scheduling sequence, and outputting the time-division data; and adding a cyclic redundancy check, CRC code into the outputted time-division data, and packaging the outputted time-division data and the CRC code into a linear overhead frame.

In an embodiment, the framing and outputting module 405 is further configured for: coding the packaged linear overhead frame.

As shown in FIG. 5, an embodiment of the present disclosure further provides an overhead monitoring apparatus, including a receiving module 401, a de-interleaving module 402, a cross-selection module 403, an overhead extracting module 404 and a framing and outputting module 405, wherein: the receiving module 401 is configured for receiving a flexible Ethernet FlexE signals from one or more physical layer PHY interfaces respectively, wherein a transmission rate of each received FlexE signal is an integral multiple of Y Gbps, wherein Y is a predetermined basic transmission rate; the de-interleaving module 402 is configured for de-interleaving a FlexE signal with a transmission rate of N*Y Gbps received into N PHY signals each having a transmission rate of Y Gbps; wherein, N is a natural number greater than 1 and may vary with the received FlexE signals; the cross-selection module 403 is configured for selecting M valid data signals from the FlexE signal with the transmission rate being the target transmission rate in the received FlexE signals and the de-interleaved PHY signals each having a transmission rate of Y Gbps, wherein M is a natural number greater than or equal to 1; the overhead extracting module 404 is configured for removing each pad from each of the M valid data signals, performing frame delimitation on each of the M valid data signals, and extracting each FlexE overhead in each of the M valid data signals; and the framing and outputting module 405 is configured for generating a linear overhead frame based on the extracted FlexE overheads, and outputting the linear overhead frame.

In an embodiment, Y equals to 100. The transmission rate of a FlexE signal received by the receiving module 401 is an integer multiple of 100 Gbps, such as, 100 Gbps, 200 Gbps, 400-G bps, or the like.

In this disclosure, for various FlexE PHY interfaces, such as PHYs with 100 Gbps, 200 Gbps, 400 Gbps or other transmission rates, the overhead are processed in the same manner and in accordance with that of the transmission rate of 100 Gbps and irrelevant of a particular transmission rate of that interface, which requires the de-interleaving module 402 to de-interleave the FlexE signals with 200 Gbps, 400 Gbps or other rates to respectively generate two, four or other quantity of FlexE signals each having a transmission rate of 100 Gbps, and then to perform overhead extracting and processing.

For example, as shown in FIG. 4, in the case that the received FlexE signals include n0 FlexE signals each having a transmission rate of 200 Gbps, n1 FlexE signals each having a transmission rate of 400 Gbps and n2 FlexE signals each having a transmission rate of 100 Gbps, the n0 FlexE signals each having a transmission rate of 200 Gbps and n1 FlexE signals each having a transmission rate of 400 Gbps are respectively de-interleaved into n0*2 FlexE signals each having a transmission rate of 100 Gbps and n1*4 FlexE signals each having a transmission rate of 100 Gbps by the de-interleaving module 402. M valid data signals are selected from the n2 FlexE signals each having a transmission rate of 100 Gbps received and the de-interleaved (n0*2+n1*4) FlexE signals each having a transmission rate of 100 Gbps by the cross-selection module 403, wherein M is a natural number ranging from 1 to j, and j*100 Gbps is the maximum bandwidth of a FlexE chip. The valid data signals in the embodiments of the present invention refer to the FlexE signals that transmit valid data.

In an embodiment, the overhead extracting module 404 is configured for removing each pad from each of the M valid data signals through the following steps: determining whether each valid data signal is a received FlexE signal with the transmission rate of Y Gbps or a de-interleaved PHY signal with the transmission rate of Y Gbps; in response to a determination that each valid data signal is a FlexE signal with a transmission rate of Y Gbps, determining that no pad presents in each valid data signal; and in response to a determination that a valid data signal is a de-interleaved PHY signal with a transmission rate of Y Gbps, determining that at least one pad presents in that valid data signal, and removing each pad.

In an embodiment, the overhead extracting module 404 is configured for performing frame delimitation on each of the M valid data signals through the following steps of, respectively performing the following operations on each of the M valid data signals: searching for a FlexE frame header according to a predetermined frame header pattern; and after the FlexE frame header is found, determining a position of the FlexE overhead to be extracted and a position number i of the FlexE overhead to be extracted in a multiframe, wherein i is an integer ranging from 0 to 31.

In an embodiment, the framing and outputting module 405 is configured for generating a linear overhead frame based on the extracted FlexE overheads through the following steps: dividing a row of the FlexE overheads in a FlexE frame into one or more linear overhead frames; or, combining a plurality of rows of the FlexE overheads in the FlexE frame into one linear overhead frame.

As can be seen from the FlexE overhead frame format in FIG. 1, the FlexE overhead frame has 8 rows in total, and each row has a 66-bit FlexE overhead. Excluding the 2-bit sync header, the FlexE overhead in each row takes up 64 bits. When the overheads are being extracted, the FlexE overheads of a plurality of rows may be combined together end to end and be packaged into one linear overhead frame or one row of the FlexE overheads may be split into a plurality of linear overhead frames according to bandwidth for the linear overhead frame (for example, the FlexE overhead frame of 8 rows may be split into 4 groups with each group having 2 rows, and every 2 rows are combined together end to end and packaged into one linear overhead frame, so that all the 8 rows of the FlexE overheads in one FlexE frame may be packaged into 4 linear overhead frame respectively and may be transmitted in four times with one linear overhead frame transmitted each time).

In an embodiment, the framing and outputting module 405 is configured for generating a linear overhead frame based on the extracted FlexE overheads through the following steps: adding an overhead alarm at one of more of preset fixed all-zero positions and/or at a reserved field position in the FlexE overhead, wherein the overhead alarm is indicative of a status of the FlexE overhead.

In this embodiment, after the frame header is found, the FlexE overhead is extracted at a fixed position and processed to generate an overhead alarm.

It can be seen from FIG. 1 that 28 bits in the first row of FlexE overheads are fixedly set to be all zeros, and a plurality of bits in each of the second and third rows of FlexE overheads are served as reserved fields. By using these preset fixed all-zero positions or reserved field positions, a plurality of overhead alarms may be transmitted, and real time monitoring and controlling can be performed over these overhead alarms off-chip and response can be made in time.

In an embodiment, the framing and outputting module 405 is configured for generating a linear overhead frame based on the extracted FlexE overheads through the following steps: converting the extracted FlexE overheads into time-division data according to a predetermined round-robin scheduling sequence, and outputting the time-division data; and packaging the outputted time-division FlexE overhead into a linear overhead frame.

In another embodiment, the framing and outputting module 405 is configured for generating a linear overhead frame based on the extracted FlexE overheads through the following steps: converting the extracted FlexE overheads into time-division data according to a predetermined round-robin scheduling sequence, and outputting the time-division data; and adding a CRC code into the outputted time-division data, and packaging the outputted time-division data and the CRC code into a linear overhead frame.

In an embodiment, the framing and outputting module 405 is further configured for: coding the packaged linear overhead frame.

In an example of this embodiment, the framing and outputting module 405 is configured for coding the packaged linear overhead frame through the following step: performing 8b/10b or 64b/66b coding on the packaged linear overhead frame.

After the FlexE overheads are extracted, the overhead data extracted from a plurality of FlexE signals with the transmission rate of 100 Gbps need to be converted into time-division data through a round-robin scheduling and then to be outputted. On the condition that the linear overhead frame meets the bandwidth requirement, the overhead data only needs to be outputted according to the order of the physical PHY numbers, a Cyclic Redundancy Check, CRC code is added to the outputted time-division FlexE overhead data, and then the time-division data and the CRC code are together packaged into a linear overhead frame. Coding (such as 8b/10b coding and 64b/66b coding) is performed on the linear overhead frame, and then the linear overhead frame is converted into a serdes clock domain through asynchronous FIFO, and then outputted off-chip. It is not intended to limit how to output the generated overhead line frame off-chip in this disclosure, for example, the generated linear overhead frame may also be outputted off-chip by other cross-clock domain conversion methods except serdes.

By using the overhead monitoring method and apparatus, and the computer-readable storage medium of the embodiments of the present disclosure, the FlexE overhead can be monitored off-chip in a flexible manner with little increase of resources, and meanwhile, an interface can be reserved for future utilization of the FlexE overhead reserved fields.

The invention claimed is:

1. An overhead monitoring method, performed by a processor, the method comprising:
receiving a flexible Ethernet (FlexE) signal from at least one physical layer PHY interface respectively, wherein the received FlexE signal comprises the FlexE signal with a transmission rate being N times of Y Gbps and the FlexE signal with a transmission rate being a target transmission rate, the FlexE signal with a transmission rate being the target transmission rate comprises at least one of the FlexE signal with a transmission rate of $$\frac{Y}{2} \ Gbps$$

and the FlexE signal with a transmission rate of X Gbps, where Y is a predetermined basic transmission rate, X=Y*C, N is a natural number greater than 1, and C is a fixed coefficient;

de-interleaving the FlexE signal with a transmission rate of N*Y Gbps in the received FlexE signal respectively into N PHY signals each having a transmission rate of Y Gbps;

selecting M valid data signals from the FlexE signal with the transmission rate being the target transmission rate in the received FlexE signal and de-interleaved PHY signals each having a transmission rate of Y Gbps, wherein M is a natural number greater than or equal to 1;

removing each pad from each of the M valid data signals, performing frame delimitation on each of the M valid data signals, and extracting each FlexE overhead from each of the M valid data signals; and generating a linear overhead frame based on extracted FlexE overheads, and outputting the linear overhead frame for monitoring; wherein, the linear overhead frame comprises each extracted FlexE overhead.

2. The overhead monitoring method as claimed in claim 1, wherein performing frame delimitation on each of the M valid data signals comprises:
respectively performing following operations on each of the M valid data signals:
searching for a FlexE frame header according to a preset frame header pattern; and
after the FlexE frame header is found, determining a position of the FlexE overhead to be extracted and a position number i of the FlexE overhead to be extracted in a multiframe, wherein i is an integer ranging from 0 to 31.

3. The overhead monitoring method as claimed in claim 2, wherein removing each pad form each of the M valid data signals comprises:
in response to a determination that the FlexE signal with a transmission rate being the target transmission rate comprises a FlexE signal with a transmission rate of $$\frac{Y}{2} \ Gbps$$

and does not comprise any FlexE signal with a transmission rate of X Gbps, determining that at least one pad presents in each valid data signal of the M valid data signals, and removing each pad;

in response to a determination that the FlexE signal with the transmission rate being the target transmission rate comprises a FlexE signal with a transmission rate of X Gbps and does not comprise any FlexE signal with a transmission rate of $$\frac{Y}{2} \ Gbps,$$

further determining whether each valid data signal of the M valid data signals is a FlexE signal with a transmission rate of X Gbps or a PHY signal a the transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and in response to a determination that the FlexE signal with the transmission rate being the target transmission rate comprises a FlexE signal with a transmission rate of $$\frac{Y}{2} Gbps$$

and a FlexE signal with a transmission rate of X Gbps, determining whether each valid data signal of the M valid data signals is a FlexE signal with a transmission rate of X Gbps, a FlexE signal with a transmission rate of $$\frac{Y}{2} Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2} Gbps$$

or a PHY signal with a transmission rate of Y Gbps, determining that at least one pad presents in each valid data signal, and removing each pad.

4. The overhead monitoring method as claimed in claim 1, wherein generating a linear overhead frame based on the extracted FlexE overheads comprises:
dividing a row of the FlexE overheads in a FlexE frame into at least one linear overhead frame; or,
combining a plurality of rows of the FlexE overheads in the FlexE frame into one linear overhead frame.

5. The overhead monitoring method as claimed in claim 4, wherein removing each pad form each of the M valid data signals comprises:
in response to a determination that the FlexE signal with a transmission rate being the target transmission rate comprises a FlexE signal with a transmission rate of $$\frac{Y}{2} Gbps$$

and does not comprise any FlexE signal with a transmission rate of X Gbps, determining that at least one pad presents in each valid data signal of the M valid data signals, and removing each pad;
in response to a determination that the FlexE signal with the transmission rate being the target transmission rate comprises a FlexE signal with a transmission rate of X Gbps and does not comprise any FlexE signal with a transmission rate of $$\frac{Y}{2} Gbps,$$

further determining whether each valid data signal of the M valid data signals is a FlexE signal with a transmission rate of X Gbps or a PHY signal a the transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and
in response to a determination that the FlexE signal with the transmission rate being the target transmission rate comprises a FlexE signal with a transmission rate of $$\frac{Y}{2} Gbps$$

and a FlexE signal with a transmission rate of X Gbps, determining whether each valid data signal of the M valid data signals is a FlexE signal with a transmission rate of X Gbps, a FlexE signal with a transmission rate of $$\frac{Y}{2} Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2} Gbps$$

or a PHY signal with a transmission rate of Y Gbps, determining that at least one pad presents in each valid data signal, and removing each pad.

6. The overhead monitoring method as claimed in claim 1, wherein generating a linear overhead frame based on the extracted FlexE overheads comprises:
adding an overhead alarm at, at least one of, at least one preset fixed all-zero positions and a reserved field position in the FlexE overhead, wherein the overhead alarm is indicative of a status of the FlexE overhead.

7. The overhead monitoring method as claimed in claim 6, wherein removing each pad form each of the M valid data signals comprises:
in response to a determination that the FlexE signal with a transmission rate being the target transmission rate comprises a FlexE signal with a transmission rate of $$\frac{Y}{2} Gbps$$

and does not comprise any FlexE signal with a transmission rate of X Gbps, determining that at least one pad presents in each valid data signal of the M valid data signals, and removing each pad;

in response to a determination that the FlexE signal with the transmission rate being the target transmission rate comprises a FlexE signal with a transmission rate of X Gbps and does not comprise any FlexE signal with a transmission rate of $$\frac{Y}{2} Gbps,$$

further determining whether each valid data signal of the M valid data signals is a FlexE signal with a transmission rate of X Gbps or a PHY signal a the transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and in response to a determination that the FlexE signal with the transmission rate being the target transmission rate comprises a FlexE signal with a transmission rate of $$\frac{Y}{2} Gbps$$

and a FlexE signal with a transmission rate of X Gbps, determining whether each valid data signal of the M valid data signals is a FlexE signal with a transmission rate of X Gbps, a FlexE signal with a transmission rate of $$\frac{Y}{2} Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2} Gbps$$

or a PHY signal with a transmission rate of Y Gbps, determining that at least one pad presents in each valid data signal, and removing each pad.

8. The overhead monitoring method as claimed in claim 1, wherein generating a linear overhead frame based on the extracted FlexE overheads comprises:

converting the extracted FlexE overheads into time-division data according to a predetermined round-robin scheduling sequence, and outputting the time-division data;

adding a Cyclic Redundancy Check, CRC code into the outputted time-division data, and packaging the outputted time-division data and the CRC code into the linear overhead frame; and coding the packaged linear overhead frame.

9. The overhead monitoring method as claimed in claim 8, wherein removing each pad form each of the M valid data signals comprises:

in response to a determination that the FlexE signal with a transmission rate being the target transmission rate comprises a FlexE signal with a transmission rate of $$\frac{Y}{2} Gbps$$

and does not comprise any FlexE signal with a transmission rate of X Gbps, determining that at least one pad presents in each valid data signal of the M valid data signals, and removing each pad;

in response to a determination that the FlexE signal with the transmission rate being the target transmission rate comprises a FlexE signal with a transmission rate of X Gbps and does not comprise any FlexE signal with a transmission rate of $$\frac{Y}{2} Gbps,$$

further determining whether each valid data signal of the M valid data signals is a FlexE signal with a transmission rate of X Gbps or a PHY signal a the transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and in response to a determination that the FlexE signal with the transmission rate being the target transmission rate comprises a FlexE signal with a transmission rate of $$\frac{Y}{2} Gbps$$

and a FlexE signal with a transmission rate of X Gbps, determining whether each valid data signal of the M valid data signals is a FlexE signal with a transmission rate of X Gbps, a FlexE signal with a transmission rate of $$\frac{Y}{2} Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2} Gbps$$

or a PHY signal with a transmission rate of Y Gbps, determining that at least one pad presents in each valid data signal, and removing each pad.

10. The overhead monitoring method as claimed in claim 1, wherein removing each pad form each of the M valid data signals comprises:
in response to a determination that the FlexE signal with a transmission rate being the target transmission rate comprises a FlexE signal with a transmission rate of $$\frac{Y}{2}\ Gbps$$

and does not comprise any FlexE signal with a transmission rate of X Gbps, determining that at least one pad presents in each valid data signal of the M valid data signals, and removing each pad;
in response to a determination that the FlexE signal with the transmission rate being the target transmission rate comprises a FlexE signal with a transmission rate of X Gbps and does not comprise any FlexE signal with a transmission rate of $$\frac{Y}{2}\ Gbps,$$

further determining whether each valid data signal of the M valid data signals is a FlexE signal with a transmission rate of X Gbps or a PHY signal a the transmission rate of Y Gbps, in response to a determination that each valid data signal is a FlexE signal with a transmission rate of X Gbps, determining that no pad presents in each valid data signal, and in response to a determination that each valid data signal is a PHY signal with a transmission rate of Y Gbps, determining that at least one pad presents in each valid data signal, and removing each pad; and
in response to a determination that the FlexE signal with the transmission rate being the target transmission rate comprises a FlexE signal with a transmission rate of $$\frac{Y}{2}\ Gbps$$

and a FlexE signal with a transmission rate of X Gbps, determining whether each valid data signal of the M valid data signals is a FlexE signal with a transmission rate of X Gbps, a FlexE signal with a transmission rate of $$\frac{Y}{2}\ Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2}\ Gbps$$

or a PHY signal with a transmission rate of Y Gbps, determining that at least one pad presents in each valid data signal, and removing each pad.

11. A non-transitory computer-readable storage medium storing at least one program thereon, wherein the at least one program is executable by at least one processor, so as to implement an overhead monitoring method, comprising:
receiving a flexible Ethernet (FlexE) signal from at least one physical layer PHY interface respectively, wherein the received FlexE signal comprises the FlexE signal with a transmission rate being N times of Y Gbps and the FlexE signal with a transmission rate being a target transmission rate, the FlexE signal with a transmission rate being the target transmission rate comprises at least one of the FlexE signal with a transmission rate of $$\frac{Y}{2}\ Gbps$$

and the FlexE signal with a transmission rate of X Gbps, where Y is a predetermined basic transmission rate, X=Y*C, N is a natural number greater than 1, and C is a fixed coefficient;
de-interleaving the FlexE signal with a transmission rate of N*Y Gbps in the received FlexE signal respectively into N PHY signals each having a transmission rate of Y Gbps; selecting M valid data signals from the FlexE signal with the transmission rate being the target transmission rate in the received FlexE signal and de-interleaved PHY signals each having a transmission rate of Y Gbps, wherein M is a natural number greater than or equal to 1;
removing each pad from each of the M valid data signals, performing frame delimitation on each of the M valid data signals, and extracting each FlexE overhead from each of the M valid data signals; and
generating a linear overhead frame based on extracted FlexE overheads, and outputting the linear overhead frame for monitoring; wherein, the linear overhead frame comprises each extracted FlexE overhead.

12. An overhead monitoring apparatus, comprising a processor and a memory, wherein: the processor is configured to execute a program stored in the memory to implement an overhead monitoring method, comprising:
receiving a flexible Ethernet (FlexE) signal from at least one physical layer PHY interface respectively, wherein the received FlexE signal comprises the FlexE signal with a transmission rate being N times of Y Gbps and the FlexE signal with a transmission rate being a target transmission rate, the FlexE signal with a transmission rate being the target transmission rate comprises at least one of the FlexE signal with a transmission rate of $$\frac{Y}{2}\ Gbps$$

and the FlexE signal with a transmission rate of X Gbps, where Y is a predetermined basic transmission rate, X=Y*C, N is a natural number greater than 1, and C is a fixed coefficient;
de-interleaving the FlexE signal with a transmission rate of N*Y Gbps in the received FlexE signal respectively into N PHY signals each having a transmission rate of Y Gbps;

selecting M valid data signals from the FlexE signal with the transmission rate being the target transmission rate in the received FlexE signal and de-interleaved PHY signals each having a transmission rate of Y Gbps, wherein M is a natural number greater than or equal to 1;

removing each pad from each of the M valid data signals, performing frame delimitation on each of the M valid data signals, and extracting each FlexE overhead from each of the M valid data signals; and generating a linear overhead frame based on extracted FlexE overheads, and outputting the linear overhead frame for monitoring; wherein, the linear overhead frame comprises each extracted FlexE overhead.

13. An overhead monitoring apparatus, comprising a receiving module, a de-interleaving module, a cross-selection module, an overhead extracting module and a framing and outputting module, wherein:

the receiving module is configured for receiving a flexible Ethernet FlexE signal from at least one physical layer PHY interface respectively, wherein each received FlexE signal comprises a FlexE signal with a transmission rate being N times of Y Gbps and a FlexE signal with a transmission rate being a target transmission rate, the FlexE signal with a transmission rate being the target transmission rate comprises at least one of, a FlexE signal with a transmission rate of >Gbps and a FlexE signal with a transmission rate of X Gbps, where Y is a predetermined basic transmission rate, X=Y*C, N is a natural number greater than 1, and C is a fixed coefficient; the de-interleaving module is configured for de-interleaving each FlexE signal with a transmission rate of N*Y Gbps in the received FlexE signals respectively into N PHY signals each having a transmission rate of Y Gbps;

the cross-selection module is configured for selecting M valid data signals from the FlexE signal with a transmission rate being the target transmission rate in the received FlexE signals and de-interleaved PHY signals with a transmission rate of Y Gbps, wherein M is a natural number greater than or equal to 1;

the overhead extracting module is configured for removing each pad form each of the M valid data signals, performing frame delimitation on each of the M valid data signals, and extracting each FlexE overhead form each of the M valid data signals; and the framing and outputting module is configured for generating a linear overhead frame based on the extracted FlexE overheads, and outputting the linear overhead frame; wherein, the linear overhead frame comprises each extracted FlexE overhead.

14. The overhead monitoring apparatus as claimed in claim 13, wherein the overhead extracting module is configured for removing each pad form each of the M valid data signals through following steps:

in response to a determination that the FlexE signal with a transmission rate being the target transmission rate comprises a FlexE signal with the transmission rate of $$\frac{Y}{2}\ Gbps$$

and does not comprise any FlexE signal with a transmission rate of X Gbps, determining that at least one pad presents in each valid data signal of the M valid data signals, and removing each pad;

in response to a determination that the FlexE signal with a transmission rate being the target transmission rate comprises a FlexE signal with a transmission rate of X Gbps and does not comprise any FlexE signal with a transmission rate of $$\frac{Y}{2}\ Gbps,$$

further determining whether each valid data signal of the M valid data signals is a FlexE signal with a transmission rate of X Gbps or a PHY signal with a transmission rate of Y Gbps, in response to a determination that each valid data signal is a FlexE signal with a transmission rate of X Gbps, determining that no pad presents in each valid data signal; and in response to a determination that each valid data signal is a PHY signal with a transmission rate of Y Gbps, determining that at least one pad presents in each valid data signal, and removing each pad; and in response to a determination that the FlexE signal with a transmission rate being the target transmission rate comprises a FlexE signal with a transmission rate of $$\frac{Y}{2}\ Gbps$$

and a FlexE signal with a transmission rate of X Gbps, further determining whether each valid data signal of the M valid data signals is a FlexE signal with a transmission rate of X Gbps, a FlexE signal with a transmission rate of $$\frac{Y}{2}\ Gbps$$

or a PHY signal with a transmission rate of Y Gbps; in response to a determination that each valid data signal is a FlexE signal with a transmission rate of X Gbps, determining that no pad presents in each valid data signal; and in response to a determination that each valid data signal is a PHY signal with a transmission rate of $$\frac{Y}{2}\ Gbps$$

or a PHY signal with a transmission rate of Y Gbps, determining that at least one pad presents in each valid data signal, and removing each pad.

* * * * *